(12) United States Patent
Lee

(10) Patent No.: US 9,145,506 B2
(45) Date of Patent: Sep. 29, 2015

(54) NATURAL ADHESIVE

(71) Applicant: JR CO., LTD., Jinju-si, Gyeongsangnam-do (KR)

(72) Inventor: Jin Hwa Lee, Jinju-si (KR)

(73) Assignee: JR CO., LTD., Jinju-Si, Gyeongsangnam-Do (KR)

( * ) Notice: Subject to any disclaimer, the term of this patent is extended or adjusted under 35 U.S.C. 154(b) by 85 days.

(21) Appl. No.: 13/932,626

(22) Filed: Jul. 1, 2013

(65) Prior Publication Data
US 2015/0000560 A1  Jan. 1, 2015

(51) Int. Cl.
*C08L 5/00* (2006.01)
*C09J 189/00* (2006.01)

(52) U.S. Cl.
CPC ..................... *C09J 189/00* (2013.01)

(58) Field of Classification Search
USPC ............................ 106/146.51, 146
See application file for complete search history.

(56) References Cited

U.S. PATENT DOCUMENTS

| | | | |
|---|---|---|---|
| 5,552,452 A * | 9/1996 | Khadem et al. | 522/63 |
| 6,894,140 B2 * | 5/2005 | Roby | 528/70 |
| 2002/0173770 A1 * | 11/2002 | Flory et al. | 604/537 |
| 2010/0055080 A1 * | 3/2010 | Song et al. | 424/93.21 |
| 2011/0027341 A1 * | 2/2011 | Mirelman et al. | 424/430 |
| 2011/0118363 A1 * | 5/2011 | Jensen et al. | 514/772.4 |
| 2012/0064239 A1 * | 3/2012 | Kruglick et al. | 427/207.1 |

FOREIGN PATENT DOCUMENTS

WO   WO 03/024437   *  3/2003

* cited by examiner

*Primary Examiner* — Melvin C Mayes
*Assistant Examiner* — Kenneth Vaden
(74) *Attorney, Agent, or Firm* — Lowe Hauptman & Ham, LLP

(57) ABSTRACT

The present invention relates to a natural adhesive containing protein and free sugar. The natural adhesive contains allinage and aline. The natural adhesive further contains lectine.

12 Claims, 2 Drawing Sheets

NATURAL ADHESIVE

BACKGROUND OF THE INVENTION

1. Field of the Invention

The present invention relates to a natural adhesive, and more particularly, to a natural adhesive having anti-bacterial and anti-fungal properties, which is capable of excluding organic compounds and chemicals from a mixture of protein and sugar.

2. Description of the Related Art

In general, an adhesive refers to a polymeric material which is used for bonding between homogenous or heterogeneous objects. Such an adhesive is closely adhered to an object as it is solidified over time from an initial liquid state.

Here, the adhesion is different from the bonding in that the former accompanies wetting. The wetting refers to a phenomenon caused by mutual similarity between an adhesive and an object. However, when an adhesive contacts the object, it evenly permeates into the object through the wetting and is bonded and solidified to the object by exerting a mechanical and chemical adhesive force due to adhesive strength generation factors such as anchoring, zipper, capillary and so on. Once the adhesive is solidified, it is kept in a tight adhesive condition without being broken by an external factor such as temperature, humidity, pressure and so on.

Accordingly, an excellent adhesive is required to have excellent properties in terms of contact, wetting, bonding, maintenance and so on. Adhesives mainly used at present may be classified into inorganic adhesives and organic adhesives.

TABLE 1

| Inorganic adhesive | | Cements, soda-silicate (water glass), ceramics, others |
|---|---|---|
| Organic adhesives | Synthetic resins | Thermosetting | ureas, melanins, phenols, unsaturated polyesters, epoxys, resolsinols |
| | | Thermoplasic | vinyl acetate, polyvinyl alcohols, vinyl chloride, polyvinyl acetals, acryls, saturated polyesters, polyamides, polyethylenes |
| | | Rubbers (styrenes) | Butadiene rubbers, nitrile rubbers, butyl rubbers, silicone rubbers, chloroprene |
| | Rubbers | Mixture (Phenols) | vinyl phenol-chlroroprene rubbers |
| | | Epoxy | polyamides, nitrile rubber-epoxys |
| | Naturals | Starchs | starch, dextrines |
| | | Proteins | glue, casein |
| | | Resins | pine resin, shellac |
| | | Rubbers | latex, rubber cements Asphalt paper |

On the other hand, with recent increasing environmental corruptions and rising interest in comfortable residential environments, efforts have continued to make to alleviate various damages such as headache, atopic dermatitis, asthma and the like, including a sick house syndrome, which are caused by harmful chemicals such as formaldehyde and the like. The sick house syndrome is caused by organic chemicals such as benzene, toluene, xylene, ethylbenzene, acetaldehyde, dichlorobenzene, styrene and so on, in addition to formaldehyde, which are mainly produced from adhesives, building materials and so on.

Accordingly, there is an increasing demand for a so-called natural adhesive without addition or use of volatile organic chemicals. However, if such volatile organic chemicals are excluded from the whole process of manufacture and production, the natural adhesive shows a disadvantage of poor storage stability and quick corruption. Therefore, most of natural adhesives available in market contain preservatives such as formaldehyde and the like, even a little. Furthermore, volatile organic chemicals are being used in the course of manufacture and storage of resins, solvents, catalysts, curing agents, additive agents and so on, with no restriction.

However, this may result in canceration as well as disease such as headache, atopic dermatitis, asthma, sick house syndrome and the like as the organic chemicals are evaporated in the course of drying and curing.

SUMMARY OF THE INVENTION

To overcome the above problems, it is an object of the present invention to provide a natural adhesive with high adhesion as well as high storage stability, with on organic chemicals.

To achieve the above object, according to an aspect of the invention, there is provided a natural adhesive containing protein and free sugar, containing: alliinase and aline.

The natural adhesive of the present invention provides the following effects.

The inventive natural adhesive shows an advantage of excellent adhesion with no organic chemicals. In particular, the inventive natural adhesive provides effects of high resistance against bacteria and fungus, proper consistency viscosity and nonvolatile content and hence high workability.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
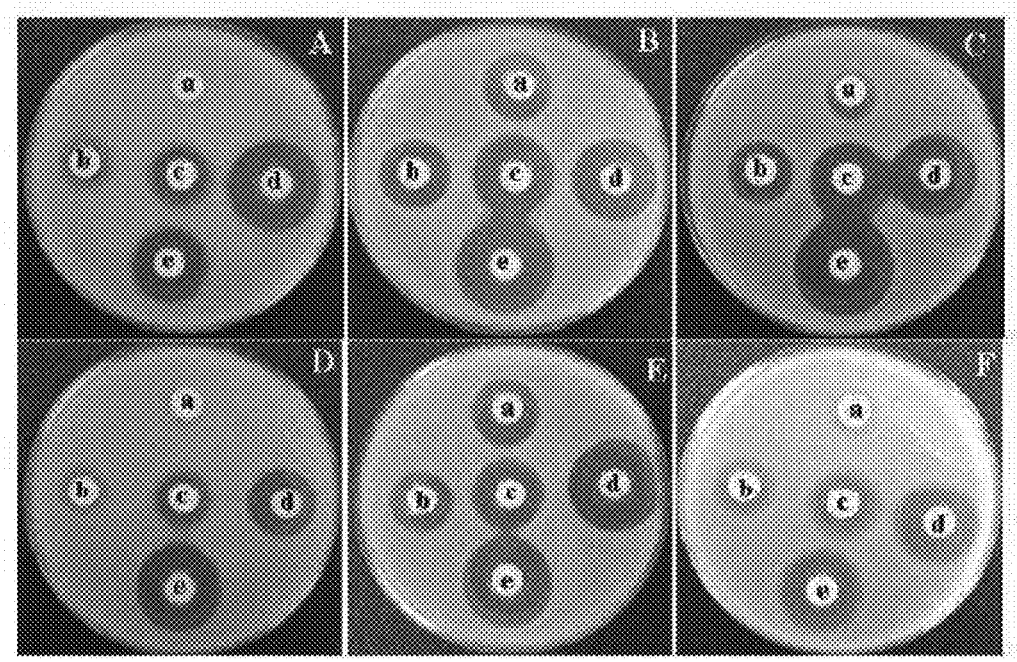
FIG. 1 is a photograph showing anti-bacterial properties of a natural adhesive according to an embodiment of the present invention.

Hereinafter, embodiments of the present invention will be described in detail with reference to the accompanying drawings. However, it is to be understood that the present invention is not limited or restricted by these embodiments. Throughout the drawings, the same elements are denoted by the same reference numerals.

An inventive natural adhesive may contain protein and sugar.

To begin with, the protein may include one or more of hydroxy proline, glutamic acid, proline, glycine and alanine.

The protein plays a role to generate an adhesive force as it is hardened while being reduced from a sol state to a gel state (or collagen).

The protein may further include one or more of threonine, serine, glycine, alanine, cysteine, methionine, isoleucine, leucine, tyrosine, phenylalanine, ethanolamine, ammonia, ornithine, hystidine, asparagine, vanillin, lysine and arginine.

The natural adhesive may contain sugar. The sugar may include one or more of fructose, glucose, sucrose and maltose, which play a role to generate an adhesive force in combination.

The natural adhesive may further contain a fatty acid. The fatty acid may include one or more of lauric acid, myristic acid, palmitic acid, stearic acid, oleic acid, linoleic acid, linolenic acid, arachidic acid and behenic acid.

The natural acid may further contain alliinase, aline or allicin. The allicin has a high anti-bacterial property and a high volatile property. The allicin is made by transformation of aline by alliinase and prevents sugar and protein from being corrupted to spoiled.

The natural adhesive may further contain lectine. The lectine plays a role to increase an adhesive force in combination with other sugar such as alliinase.

Several embodiments will be described in detail below by way of adhesives containing protein and sugar which are extracted from garlics.

Embodiment 1

In order to obtain a natural adhesive composition according to a first embodiment of the present invention, protein and sugar are obtained from concentrate having the water content of 61.5% produced by filtering a mixture of water and pulverized garlic (with a ratio of 2 to 3 ml (2.5 ml) of water to 1 g of garlic) with a whatmanNo 2 filter paper at the room temperature (25° C.) with the lapse of 2 hours.

Table 2 shows results of analysis on components of the natural adhesive composition according to the first embodiment and Table 3 shows results of analysis on protein of the natural adhesive composition according to the first embodiment.

TABLE 2

| Component | | Content (wt %) |
|---|---|---|
| Sugar | fructose | 0.322 |
| | glucose | 0.000 |
| | sucrose | 0.025 |
| | maltose | 0.000 |
| Protein | | 0.4 (mg/100 g) |

TABLE 3

| No. | Amino acid | Content (mg/100 g) |
|---|---|---|
| 1 | hydroxyproline | 232.344 |
| 2 | threonine | 2.605 |
| 3 | serine | 4.853 |
| 4 | asparagine | 14.043 |
| 5 | glutamic acid | 20.461 |
| 6 | proline | 11.952 |
| 7 | glycine | 1.351 |
| 8 | alanine | 5.135 |
| 9 | valine | 8.435 |
| 10 | cystine | 2.782 |
| 11 | methionine | 1.269 |
| 12 | isoleucine | 2.218 |
| 13 | leucine | 3.959 |
| 14 | tyrosine | 2.556 |
| 15 | phenylalanine | 6.502 |
| 16 | ethanolamine | 1.192 |
| 17 | ammonia | 8.387 |
| 18 | ornithine | 1.097 |
| 19 | lysine | 10.177 |
| 20 | hystidine | 2.249 |
| 21 | arginine | 81.527 |

Embodiment 2

In order to obtain a natural adhesive composition according to a second embodiment of the present invention, protein and sugar are obtained from concentrate having the water content of 61.5% produced by filtering a mixture of water and pulverized garlic (with a ratio of 2 to 3 ml (2.5 ml) of water to 1 g of garlic) with a whatmanNo 2 filter paper at 100° C. with the lapse of 2 hours.

Table 4 shows results of analysis on components of the natural adhesive composition according to the second embodiment and Table 5 shows results of analysis on protein of the natural adhesive composition according to the second embodiment.

TABLE 4

| Component | | Content (wt %) |
|---|---|---|
| Sugar | fructose | 0.298 |
| | glucose | 0.009 |
| | sucrose | 0.135 |
| | maltose | 0.033 |
| Protein | | 0.54 (mg/100 g) |

TABLE 5

| No. | Amino acid | Content (mg/100 g) |
|---|---|---|
| 1 | hydroxyproline | 198.572 |
| 2 | threonine | 1.223 |
| 3 | serine | 2.328 |
| 4 | asparagine | 12.391 |
| 5 | glutamic acid | 7.782 |
| 6 | proline | 11.191 |
| 7 | glycine | 0.665 |
| 8 | alanine | 3.633 |
| 9 | valine | 3.603 |
| 10 | cystine | 1.763 |
| 11 | methionine | 0.089 |
| 12 | isoleucine | 0.518 |
| 13 | leucine | 0.455 |
| 14 | tyrosine | 0.323 |
| 15 | phenylalanine | 4.075 |
| 16 | ethanolamine | 0.000 |
| 17 | ammonia | 7.724 |
| 18 | ornithine | 0.482 |
| 19 | lysine | 7.136 |
| 20 | hystidine | 1.802 |
| 21 | arginine | 72.004 |

Embodiment 3

In order to obtain a natural adhesive composition according to a third embodiment of the present invention, protein and sugar are obtained from concentrate having the water content of 61.5% produced by filtering a mixture of water, pulverized garlic and viscozyme of 0.04 wt % (with a ratio of 2 to 3 ml (2.5 ml) of water to 1 g of garlic) with a whatmanNo 2 filter paper at 45° C. with the lapse of 2 hours.

Table 6 shows results of analysis on components of the natural adhesive composition according to the third embodiment and Table 7 shows results of analysis on protein of the natural adhesive composition according to the third embodiment.

TABLE 6

| Component | | Content (wt %) |
|---|---|---|
| Sugar | fructose | 0.913 |
| | glucose | 0.065 |
| | sucrose | 0.044 |
| | maltose | 0.034 |
| Protein | | 0.55 (mg/100 g) |

TABLE 7

| No. | Amino acid | Content (mg/100 g) |
|---|---|---|
| 1 | hydroxyproline | 227.079 |
| 2 | threonine | 3.368 |
| 3 | serine | 6.121 |
| 4 | asparagine | 18.612 |
| 5 | glutamic acid | 28.235 |
| 6 | proline | 21.510 |
| 7 | glycine | 2.664 |
| 8 | alanine | 6.737 |
| 9 | valine | 11.425 |
| 10 | cystine | 0.00 |
| 11 | methionine | 1.884 |
| 12 | isoleucine | 3.439 |
| 13 | leucine | 5.366 |
| 14 | tyrosine | 3.678 |
| 15 | phenylalanine | 7.647 |
| 16 | ethanolamine | 0.887 |
| 17 | ammonia | 8.466 |
| 18 | ornithine | 0.690 |
| 19 | lysine | 12.334 |
| 20 | hystidine | 2.488 |
| 21 | arginine | 90.522 |

Next, material properties and adhesive properties of the inventive natural adhesive will be described.

For reference, in the following description, the natural adhesive compositions according to the first and second embodiments are represented by first and second standard samples, respectively, and the natural adhesive composition according to the third embodiment are omitted since it has no particular difference from the first standard sample.

In order to detect the material properties of the natural adhesive composition of the present invention, candles drying time, PH, consistency viscosity, nonvolatile content and density for the first and second standard samples are measured. In addition, in order to detect the adhesive properties of the natural adhesive composition, 180° peeling strength for the first and second standard samples is measured. Their definitions and detailed measurement conditions are as follows.

(1) Candles Drying Time

Candles drying time means liquid drying time until a liquid application surface does not smear when it is touched by hands.

The present invention employs a typical adhesive or paint object check method in which typical colorless, transparent and clean plate glass is selected as a glass plate (165×60 mm) for measurement of the candles drying time, and a cut section of the glass plate is grinded and rounded by an emery grinder, is cleaned by soap, detergent and hot alkali solution, and then is washed by a mixture of methyl alcohol and toluene to prevent the glass plate from being dusted. If new plate glass is to be used, it is immersed in a mixture solution of potassium dicromate and concentrated sulfuric acid and then is washed. Then, 3 g of each of the first and second standard samples is dropped on the cleaned glass plate and is applied at a uniform thickness using a film applicator with a uniform force and speed (150 mm/sec). Time during which no adhesion is felt by fingers touched at a regular interval while maintaining certain temperature (20° C., 40° C. and 60° C.) and certain humidity is measured.

(2) PH

The first and second standard samples are diluted with the same amount of distilled water and their PHs are measured several times at 25±1° C. using a PH meter and then are averaged.

(3) Consistency Viscosity

A consistency viscosity of an adhesive is a factor having direction connection with workability and having close relation with nonvolatile content and average molecular weight and a change in consistency viscosity serves as a measure for storage stability.

In the present invention, the consistency viscosity of the first and second standard samples is measured twice using a viscometer (Brookfield Model DV-I+, rev count: 100 rpm (Spindle No 2)) while maintaining the room temperature of 20° C. and its average is represented by centipoise (cP=P/100).

(4) Nonvolatile Content

Nonvolatile content refers to a weight of material remaining after heating an adhesive to remove a volatile material. The remaining material serves as an adhesive material exhibiting an actual adhesive force.

In the present invention, a procedure of preparing an aluminum foil dish having a diameter of 4 to 5 cm, measuring its weight (W0(g)) precisely, measuring a weight (W1(g)) after putting of the first and second standard samples of 1.5 g, cooling the foil dish in a desiccator containing a drying agent after drying it in a hot wind circulation thermoset of 105±1° C. for 180±5 minutes, and measuring a weight (W3(g)) is performed twice or more for the first and second standard samples. A mean value of results obtained according to the following equation 1 is indicated by two significant digits.

$$\text{Nonvolatile content}(\%) = \{(W2-W0)/(W1-W0)\} \times 100 \quad \text{[Equation 1]}$$

(5) Density

The first and second standard samples are immersed by a volume of 100 ml in a mess cylinder (100 ml) whose weight is known, without any bubbles, under the temperature of 20±0.5° C., and their weight is measured with a scale (weighting: 500 g, loss of weight: 0.5 g) and their density is calculated according to the following equation 2.

$$S = (W1-W2)/100 \quad \text{[Equation 2]}$$

Where, S is density (g/m³), W1 is a weight (g) of standard samples plus the mess cylinder, and W2 is a weight (g) of the mess cylinder.

(6) Adhesion: 180° Peeling Strength

The present invention employs a KS F 3217 wallpaper starch adhesive check method.

A 5 mm-thick plywood (125×150 mm) having no crack and scratch is prepared, the first and second standard samples are uniformly applied on the plywood at a density of 50 g/m² using a brush or the like, a 175×150 mm cotton cloth (117 g/m²) is covered on the standard samples, the standard samples are unidirectionally pressed five times without reciprocal while applying a 49N load using a roller, and the standard samples are left alone for 48 hours under the temperature of 20° C. Then, five test specimen are made by forming cutting marks up to a plywood plane at width intervals of 25 mm using an acute knife such as a cutter or the like, a cotton cloth on one side of the test specimen is peeled off by about 50 mm, the corresponding portions of the plywood and the cotton cloth are attached to jigs of a tension tester, a tension load value based on the peeling off of the test specimen is measured while spreading intervals between the jigs until the adhered portions of the test specimen reach about 10 mm at a speed of 200 mm/min, and a undulating portion maximum value average is set to 180° peeling strength and is indicated by N/25 mm. At this time, it is appropriate that a breaking load of the test specimen falls within a range of 15 to 80% of the tension tester capacity.

The following table 8 shows results of measurement on candles drying time, PH, consistency viscosity, nonvolatile content and density for the first and second standard samples.

TABLE 8

| Check item | | First standard sample | Second standard sample |
| --- | --- | --- | --- |
| Nonvolatile content (brix) | | 60 | 60 |
| Density (g/cm³) | | 1.36 | 1.36 |
| Viscosity (cP) | | 9,098.26 | 11,388.46 |
| PH | | 7.0 | 6.7 |
| Candles drying time | 20° C. | 24 | 20.6 |
| | 40° C. | 19 | 16 |
| | 60° C. | 6 | 5 |

As shown, the first and second standard samples have the same nonvolatile content and density. The second standard sample has a viscosity higher than that of the first standard sample. The first standard sample shows neutrality, whereas the second standard sample shows subacidity. The candles drying time tends to be short with increase in temperature. For example, the second standard sample has shorter candles drying time than the first standard sample at 20° C.

As can be seen from the above table 8, the natural adhesive composition according to the first and second embodiments can be dried in 25 minutes under the room temperature of 20° C. and the viscosity is low to provide excellent workability, as opposed to high viscosity of existing starch resin which cannot be measured by a viscometer.

The following table 9 shows results of check of the nonvolatile content and adhesion of the first and second standard samples, along with results of check of the nonvolatile content and adhesion of starch and PVAc (Polyvinyl Acetate) of the existing wallpaper adhesives for the purpose of comparison.

TABLE 9

| Sample | Nonvolatile content (Brix) | 180° peeling strength (N/25 mm) |
| --- | --- | --- |
| First standard sample | 60 | 14.3 ± 1.2 |
| Second standard sample | 60 | 15.7 ± 2 |
| Starch | 16.5 | 8.4 |
| PVAc | 30.0 | 17.5 |

As can be seen from the above table, the adhesive strength of the first and second standard samples is superior to that of the starch adhesive and slightly inferior to the PVCs adhesive. That is, the first and second standard samples are even higher in nonvolatile content than the existing adhesives. In particular, the adhesion of the first and second standard samples is relatively excellent since the existing adhesives cannot increase the nonvolatile content any longer due to deterioration of workability.

On the other hand, protein and sugar in the inventive natural adhesive composition can be obtained from garlics which are well known to show excellent anti-bacterial property, thereby providing excellent anti-bacterial property. An anti-bacterial property of the first and second standard samples against bacteria and fungus will be described below.

(7) Anti-Bacterial Activity Against Bacteria

In the present invention, measurement is made based on an agar diffusion method. A harmful microscopic organism liquid nutrient solution shown in Table 10 is inoculated by 50 μl, blended and laminated on a Mueller Hinton medium containing 0.6% softagar. Next, the first standard sample is absorbed on a paper disc (available from Toyo Rhosikaisha, Ltd, 8 mm) by every 1, 3, 5, 7 and 9 mg/ml, is placed on the laminated medium and is cultured in a 35° C. thermoset. Then, a clear zone showing growth inhabitation of harmful microorganism is measured.

TABLE 10

| Groups | Strains |
| --- | --- |
| Gram(+) | Bacillus cereus KCCM-11204 |
| | Staphylococus aureus KCTC-1927 |
| Gram(−) | Pseudomonas aeruginosa ATCC-15442 |
| | Escherichia coli ATCC-25922 |
| | Salmonella typhiumurium KCTC-2208 |
| | Vibrio parahaemolyticus |

FIG. 1 shows a result of the measurement. Bacteria used for check are as follows. In the figure, a to e denote the amount of natural adhesives, that is, 1 mg/ml, 3 mg/ml, 5 mg/ml, 7 mg/ml and 9 mg/ml, respectively.

A, *Bacillus cereus* KCCM-11204
B, *Escherichia coli* ATCC-25922
C, *Pseudomonas aeruginosa* ATCC-15442
D, *Staphylococcus aureus* KCTC-1927
E, *Salmonella typhiumurium* KCTC-2208
F, *Vibrio parahaemolyticus*

It can be seen from the figure that the first and second standard samples have high anti-bacterial property in general. In particular, the first and second standard samples show high anti-bacterial property against *Escherichia coli, Pseudomonas aeruginosa, Salmonella typhiumurium* and the like. These samples begin to show anti-bacterial activity for *Escherichia coli, Pseudomonas aeruginosa* and *Salmonella typhiumurium* from 1 mg/ml and maintains high anti-bacterial activity in a range of 3 to 9 mg/ml. An anti-bacterial activity is shown from 3 mg/ml for *Bacillus cereus, Staphylococcus aureus* and *Vibrio parahaemolyticus*.

(8) Anti-Bacterial Activity Against Fungus

In the present invention, measurement is made based on an agar diffusion method as well. Sterile distilled water is distributed by 9 ml to fungus strains shown in Table 11 cultured in a flat medium, and spores are suspended and a 1 ml of spore solution is laminated on a PDA laminating medium containing 0.6% soft agar. A harmful microscopic organism liquid nutrient solution is inoculated by 50 μl, blended and laminated on a Mueller Hinton medium containing 0.6% softagar. Next, the first standard sample is absorbed on a paper disc (available from Toyo Rhosikaisha, Ltd, 8 mm) by every 1, 3, 5 and 7 mg/ml, is placed on the laminated medium and is cultured in a 35° C. thermoset. Then, a clear zone showing growth inhabitation of harmful microorganism is measured.

TABLE 11

| Groups | Strains |
| --- | --- |
| Molds | Mucor javanicus AM-2 |
| | Penicillium sp. |
| | Aspergillus niger IFO-31125 |
| | Rhizopus microspores KCTC-6969 |

Figure 2:
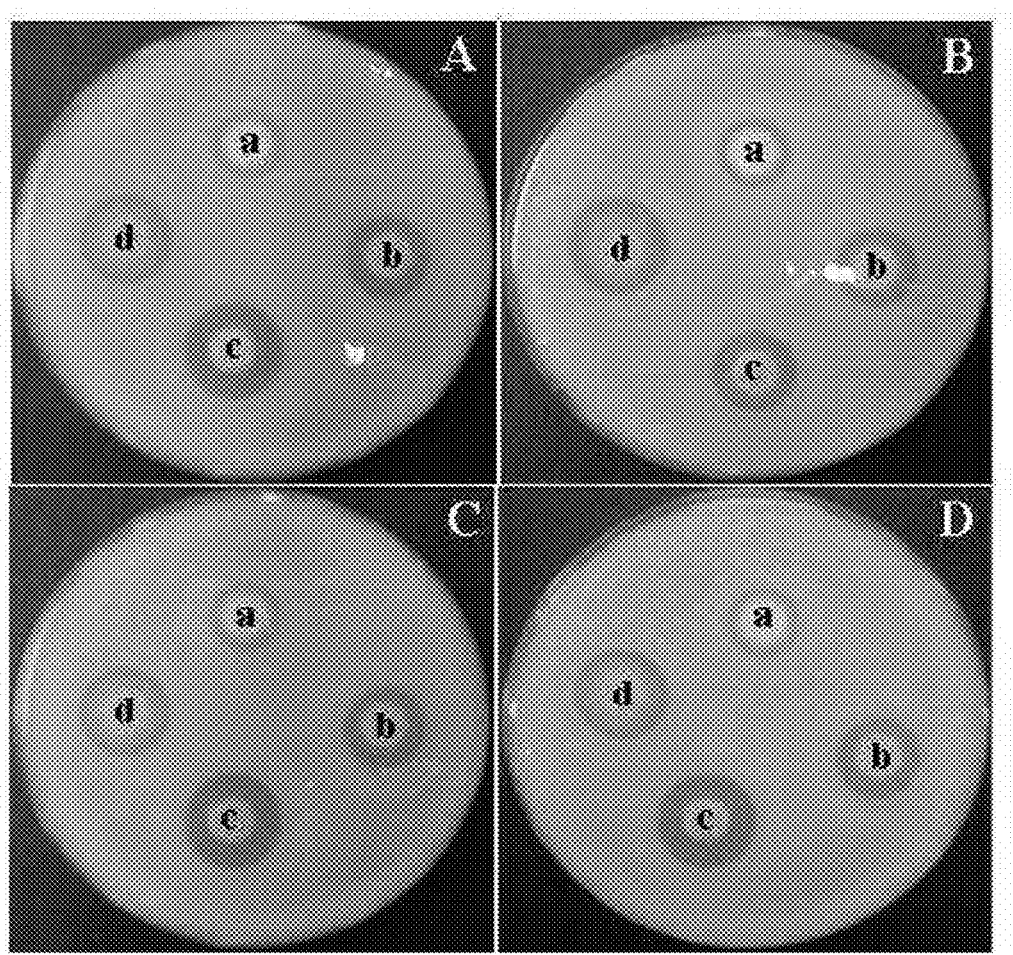
FIG. 2 is a photograph showing anti-fungal properties of a natural adhesive according to an embodiment of the present invention.

FIG. 2 shows a result of the measurement. Fungus used for check are as follows. In the figure, a to e denote the amount of natural adhesives, that is, 1 mg/ml, 3 mg/ml, 5 mg/ml and 7 mg/ml, respectively.

A, *Mucor javanicus* AM-2
B, *Penicillium* sp
C, *Aspergillus niger* IFO-31125
D, *Rhizopus microsporus* KCTC-6969

It can be seen from the figure that the first and second standard samples have high anti-fungal property in general. In particular, the first and second standard samples show the highest anti-fungal property at the density of 5 mg/ml except that *Penicillium* sp shows the highest anti-fungal property at the density of 7 mg/ml.

Accordingly, as apparent from the above, the natural adhesive composition of the present invention can provide high adhesion, anti-bacterial property and storage stability.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A natural adhesive composition containing protein and free sugar, comprising: alliinase and aline, and
   the composition further comprising: lectine,
   wherein the protein and the free sugar are obtained from concentrate produced by filtering a mixture of water and pulverized garlic with a ratio of 2 to 3 milliliters (ml) of water to 1 gram (g) of garlic at the room temperature from 25 degrees Celsius (° C.) to 100° C. with a lapse of 2 hours.

2. The natural adhesive composition according to claim 1, further comprising a fatty acid.

3. The natural adhesive composition according to claim 1, wherein the protein includes one or more selected from a group consisting of hydroxy proline, glutamic acid, proline, glycine, alanine, threonine, serine, glycine, alanine, cysteine, methionine, isoleucine, leucine, tyrosine, phenylalanine, ethanolamine, ornithine, hystidine, asparagine, vanillin, lysine and arginine.

4. The natural adhesive composition according to claim 1, wherein the free sugar includes one or more selected from a group consisting of fructose, glucose, sucrose and maltose.

5. The natural adhesive composition according to claim 1, wherein the fatty acid includes one or more selected from a group consisting of lauric acid, myristic acid, palmitic acid, stearic acid, oleic acid, linoleic acid, linolenic acid, arachidic acid and behenic acid.

6. The natural adhesive composition according to claim 1, further comprising ammonia.

7. The natural adhesive composition according to claim 1, wherein the free sugar comprises:
   fructose in an amount of 0.322 percentages (%) by weight, based on total weight of the composition
   sucrose in an amount of 0.025% by weight, based on total weight of the composition.

8. The natural adhesive composition according to claim 1, wherein the composition has a 180° peeling strength ranging from 13.1 to 15.5 newton per 25 millimeters (N/25 mm) when the composition is applied on a plywood plane having no crack or scratch.

9. The natural adhesive composition according to claim 1, wherein the free sugar comprises:
   fructose in an amount of 0.298% by weight, based on total weight of the composition;
   glucose in an amount of 0.009% by weight, based on total weight of the composition;
   sucrose in an amount of 0.135% by weight, based on total weight of the composition; and
   maltose in an amount of 0.033% by weight, based on total weight of the composition.

10. The natural adhesive composition according to claim 1, wherein the free sugar comprises:
    fructose in an amount of 0.913% by weight, based on total weight of the composition;
    glucose in an amount of 0.065% by weight, based on total weight of the composition;
    sucrose in an amount of 0.044% by weight, based on total weight of the composition; and
    maltose in an amount of 0.034% by weight, based on total weight of the composition.

11. The natural adhesive composition according to claim 1, wherein the composition has a 180° peeling strength ranging from 13.1 to 15.5 newton per 25 millimeters (N/25 mm).

12. The natural adhesive composition according to claim 1, wherein the composition has a 180° peeling strength ranging from 13.7 to 17.7 newton per 25 millimeters (N/25 mm).

* * * * *